(12) United States Patent
Huang et al.

(10) Patent No.: US 11,573,049 B2
(45) Date of Patent: Feb. 7, 2023

(54) SEALING STRUCTURE AND REFRIGERATED CONTAINER HAVING SAME

(71) Applicants: China International Marine Containers (Group) Ltd., Guangdong (CN); CIMC Containers Holding Company Ltd., Guangdong (CN); Taicang CIMC Reefer Logistics Equipment Co., Ltd., Jiangsu (CN)

(72) Inventors: Guohao Huang, Suzhou (CN); Weiting Yang, Suzhou (CN); Yugang Shen, Suzhou (CN); Hong Zhang, Suzhou (CN)

(73) Assignees: TAIGANG CIMC REEFER LOGISTICS EQUIPMENT CO., LTD.; CHINA INTERNATIONAL MARINE CONTAINERS (GROUP) LTD.; CIMC CONTAINERS HOLDING COMPANY LTD.

( * ) Notice: Subject to any disclaimer, the term of this patent is extended or adjusted under 35 U.S.C. 154(b) by 352 days.

(21) Appl. No.: 16/551,409

(22) Filed: Aug. 26, 2019

(65) Prior Publication Data
US 2019/0383552 A1   Dec. 19, 2019

Related U.S. Application Data

(63) Continuation of application No. PCT/CN2018/072066, filed on Jan. 10, 2018.

(30) Foreign Application Priority Data

Mar. 8, 2017 (CN) .......................... 201710136132.0

(51) Int. Cl.
*F25D 23/08* (2006.01)

(52) U.S. Cl.
CPC ................................. *F25D 23/087* (2013.01)

(58) Field of Classification Search
CPC ...................................................... F25D 23/087
See application file for complete search history.

(56) References Cited

U.S. PATENT DOCUMENTS

| | | | | | |
|---|---|---|---|---|---|
| 1,862,285 | A | * | 6/1932 | Terry | F25D 23/087 49/475.1 |
| 1,883,609 | A | * | 10/1932 | Dennis | F25D 23/087 49/495.1 |

(Continued)

FOREIGN PATENT DOCUMENTS

| | | |
|---|---|---|
| CN | 201761848 U | 3/2011 |
| CN | 203305821 U | 11/2013 |

(Continued)

OTHER PUBLICATIONS

European Patent Office Communication regarding App. No. 18763322.7 dated Sep. 13, 2021.

*Primary Examiner* — Daniel J Rohrhoff
(74) *Attorney, Agent, or Firm* — Mei & Mark LLP

(57) ABSTRACT

A sealing structure and a refrigerated container having same. The sealing structure comprises a base, a protruding portion, a deforming portion, and connections through holes. The base is a bar having a predetermined thickness. The protruding portion and the deforming portion are on a sealing surface of the base, and are configured to protrude outwards relative to the sealing surface and extend lengthwise along the base. The deforming portion extends by the same length as but higher than the protruding portion. When the deforming portion is subjected to a force toward the sealing surface, the height decreases. The holes are between the protruding portion and the deforming portion along the base. The holes are spaced apart from each other in the lengthwise direction of the base. The performance of the sealing structure (Continued)

improves hermeticity of products, reduces quality risks, and ensures pressure-resistance installation and anti-weathering performance that extends service life.

9 Claims, 3 Drawing Sheets

(56) References Cited

U.S. PATENT DOCUMENTS

| | | | | | |
|---|---|---|---|---|---|
| 1,889,439 | A | * | 11/1932 | Greenwald | F25D 23/087 49/490.1 |
| 2,130,017 | A | * | 9/1938 | Lewis | F25D 23/087 49/493.1 |
| 2,736,076 | A | * | 2/1956 | Bush | E06B 7/2312 49/495.1 |
| 2,767,040 | A | * | 10/1956 | Kesling | F25D 23/087 312/296 |
| 2,896,276 | A | * | 7/1959 | Read | F25D 23/087 49/496.1 |
| 2,968,845 | A | * | 1/1961 | Jackr | F25D 23/087 49/496.1 |
| 3,323,256 | A | * | 6/1967 | Reahard | E06B 7/23 49/478.1 |
| 4,138,049 | A | * | 2/1979 | McAlarney | F25D 23/087 277/629 |
| 4,509,292 | A | * | 4/1985 | Konle | F25D 23/087 49/493.1 |
| 6,739,094 | B1 | * | 5/2004 | Berry | B60J 10/24 49/478.1 |
| 7,488,900 | B1 | * | 2/2009 | Kline | F16J 15/027 174/355 |
| 2009/0261532 | A1 | | 10/2009 | Morehead | |
| 2014/0047775 | A1 | * | 2/2014 | Litch | F25D 23/087 49/489.1 |
| 2018/0299189 | A1 | * | 10/2018 | Johnson | F25D 23/087 |

FOREIGN PATENT DOCUMENTS

| | | |
|---|---|---|
| CN | 103850617 A | 6/2014 |
| CN | 203961730 U | 11/2014 |
| CN | 204451961 U | 7/2015 |
| CN | 105775454 A | 7/2016 |
| CN | 205931940 U | 2/2017 |
| CN | 205931962 U | 2/2017 |
| CN | 206569517 U | 10/2017 |
| CN | 108082755 A | 5/2018 |
| JP | H1111575 A | 1/1999 |
| WO | PCT/CN2018/072066 | 9/2018 |
| WO | PCT/CN2018/072066 | 9/2018 |

* cited by examiner

SEALING STRUCTURE AND REFRIGERATED CONTAINER HAVING SAME

CROSS-REFERENCE TO RELATED APPLICATIONS

The present disclosure is a continuation of International Application No. PCT/CN2018/072066, titled "Sealing Structure and Refrigerated Container Having Same," filed on Jan. 10, 2018, the entire subject matter and contents thereof are incorporated herein by reference.

TECHNICAL FIELD

The present invention generally relates to the technical field of container transportation, and particularly to a sealing structure and a refrigerated container having the same.

BACKGROUND

At present, a round of sealing tape is usually affixed on a surface of bolt holes on a front frame before the refrigerator of the refrigerated container is installed, which allows the front end to meet a sealing requirement after installation of the refrigerator.

Existing refrigerator tapes for refrigerated container are categorized into two types. One type is a common solid EPDM tape, and its material is EPDM. A round of tapes may be divided into four sections. The cross section of the tape is in a flat type. Both edges of the tape are provided with bosses, and there are bolt holes in the middle of the tape. The tape is installed between the surface of the front frame of the refrigerated container and the surface of the refrigerator to perform the sealing function. Another type is foaming EPDM tape, made of foaming EPDM. A round of tapes may be divided into four sections. The cross section of the tape is in a flat type and this kind of tape is thicker than the solid EPDM tape. There are bolt holes in the middle of the tape without any bosses provided on both edges. The tape is installed between the surface of the front frame of the refrigerated container and the surface of the refrigerator to perform the sealing function.

The first type is generally applied in sealing solutions of the front frame of the refrigerated container since the tape has a simple structure and is manufactured conveniently. However, its disadvantage lies in that the texture of the tape is hard due to the solid EPDM material. The inner surface of bolt hole flange for the refrigerator cannot completely fit with the solid EPDM tape, which causes a gap between the inner surface and the tape, and reduces the airtight effect of the entire front frame.

The problems caused by the first type can be efficiently avoided by the second type. However there are still problems in two aspects:

1. During the process of refrigerator installation, hidden trouble of being smashed and crushed may be readily caused to the tape due to the soft texture and poor pressure resistance of the foaming EPDM tape and high pressure applied on the tape by the refrigerator, which affect the use of the foaming EPDM tape.

2. The material of the foam-type EPDM weathers easily, which causes a short life span in normal use.

Therefore, a sealing structure and a refrigerated container are provided to at least partially solve the above problems.

SUMMARY

To at least partially solve the above problems, the present invention provides a sealing structure, comprising:

a base body being a flat and wide strip with a predetermined thickness;

a protruding portion disposed on a sealing surface of the base body for sealing and configured to be a strip boss which protrudes outwardly relative to the sealing surface and extends along a length direction of the base body;

a deforming portion disposed on the sealing surface and configured to protrude outwardly relative to the sealing surface and extend along the length direction of the base body, the deforming portion having an extension length which is same as that of the protruding portion, and an protruding height which is larger than that of the protruding portion; and a connection through-hole disposed between the protruding portion and the deforming portion and passing through the base body along a thickness direction of the base body, a plurality of the connection through-holes being disposed spaced from each other along the length direction of the base body;

wherein, the height of the deforming portion elastically decreases when the deforming portion suffers a force towards the sealing surface.

Optionally, the cross section of the deforming portion perpendicular to the length direction thereof is of O-shape or a semicircle shape.

Optionally, a cavity extending along the length direction of the deforming portion is provided in the interior of the deforming portion.

Optionally, the cross section of the cavity perpendicular to the length direction is of O-shape or a semicircle shape.

Optionally, the material of the sealing structure is flexible.

Optionally, the material of the sealing structure is EPDM.

Optionally, the cross section of the protruding portion perpendicular to the length direction thereof is of rectangle.

Optionally, a chamfering is provided at a side of the upper surface of the protruding portion along the length direction.

Optionally, the minimum distance between the connection through-hole and the protruding portion is less than the minimum distance between the connection through-hole and the deforming portion along the width direction of the base body.

In accordance with another aspect of the present invention, a refrigerated container is provided. A refrigerator is disposed in the refrigerated container, wherein, the joint of the refrigerated container and the refrigerator are sealed by any one of the sealing structures described herein.

With the sealing structure according to the present invention, a new type sealing structure is added to the structure, and the sealing performance is superior to the general refrigerated sealing structure, which significantly improves airtightness of a product and reduces hidden quality problems and simultaneously ensures performance in resistance to compression and weather during sealing structure installation; thus increasing the service life.

BRIEF DESCRIPTION OF THE DRAWINGS

The following accompanying drawings are hereby used as part of the present invention to understand the present invention. In which.

DETAILED DESCRIPTION

In the following description, numerous specific details are set forth in order to provide a more thorough understanding of the present invention. However, it is obvious to the skilled in this art that the present invention may be implemented without one or more of these details. Some technical features well-known in this art are not described in other examples so as not to confuse with the present invention.

The present invention provides a sealing structure used in places where bolts and nuts are used for connection and sealing ring or sealing gum is required to provide sealing performance, such as the sealing of the joint of a refrigerated container within a refrigerator.

Figure 1:
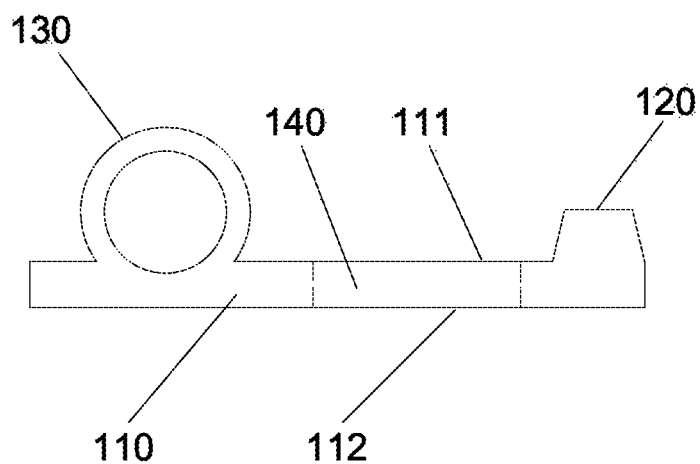
FIG. 1 is a schematic cross section view of the sealing structure according to a preferred embodiment of the present invention which is perpendicular to the length direction thereof.
Figure 2:
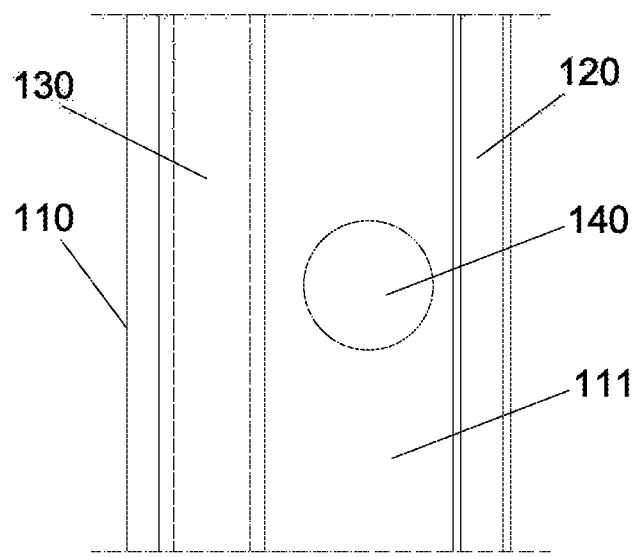
FIG. 2 is a partial top view of the sealing structure shown in FIG. 1.

As shown in FIG. 1 and FIG. 2, there is a sealing structure 10 according to a preferred embodiment of the present invention. The sealing structure 10 is made from flexible material, in order to be deformed according to the shape of a contact surface when suffered from an extrusion force so as to guarantee tight fitting, and thereby ensure sealing performance. Preferably, a solid EPDM material is applied. In this way, the sealing structure has an anti-extrusion capacity under the premise of ensuring a sealing effect. As a result, service life can be improved.

The sealing structure 10 primarily consists of four parts: a base body 110, a protruding portion 120, a deforming portion 130, and a bolt hole 140.

The base body 110 is a flat and wide strip with a predetermined thickness, which could be cut out with predetermined length according to the size of the object to be sealed during installation. The base body 110 comprises a sticking surface 112 contacting with the refrigerated container and a sealing surface 111 contacting with the refrigerator during installation. Adhesive coating is provided on the sticking surface 112 by which the sticking surface 112 is directly attached to a surface of the refrigerated container for connecting with the refrigerator when it is installed. This makes the installation convenient and can ensure the sealing performance at the same time. The sealing surface 111 is installed towards the refrigerator. A protruding portion 120 and a deforming portion 130 are disposed on the sealing surface 111.

As shown in FIG. 1 and FIG. 2, the protruding portion 120 protrudes a predetermined height outwardly from the sealing surface 111 and extends along the length direction of the base body 110 with a same length as that of the base body 110. During installation, the upper surface of the protruding portion 120 contacts with the surface of the component, such as the refrigerator bolt hole flange, and tightly fit together under the action of extrusion force of bolts and the like, so as to perform the sealing effect. Preferably, the protruding portion 120 has a predetermined width along the width direction of the base body 110, in order to increase the contact area between the protruding portion 120 and the refrigerator bolt hole flange and further improve the sealing effect. In this embodiment, the cross section of the protruding portion 120 perpendicular to the length direction may be a rectangle, which is convenient for production and manufacturing. Preferably, in order to further ensure fitting effect of the upper surface of the protruding portion 120 with the refrigerator bolt hole flange, a chamfering may be provided at both sides of the upper surface of the protruding portion 120, which avoids loose fitting due to edge lifting and improves sealing performance.

A deforming portion 130 is further provided on the sealing surface 111 of the base body 110. The deforming portion 130 is provided parallel to the protruding portion 120 and extends the same length as the protruding portion 120. The height of the deforming portion 130 protruding from the sealing surface 111 is higher than the height of the protruding portion 120. The deforming portion 130 is configured such that the height of the deforming portion 130 protruding from the sealing surface 111 elastically decreases when suffered from a force towards the sealing surface 111. Specifically, as shown in FIG. 1, the cross section of the deforming portion 130 perpendicular to the length direction is of an O-shape. Moreover, an elongated cavity along the length direction is provided inside the deforming portion 130, the cross section of which perpendicular to the length direction is also of an O-shape. In this way, the deforming portion 130 elastically deforms when subjected to an extrusion force from the refrigerator bolt hole flange towards the sealing surface 111, and a part of the outer surface thereof tightly contacts with the surface of the refrigerator bolt hole flange, thereby performing the sealing effect. It should be understood that the cross sections of the deforming portion and the cavity perpendicular to the length direction may also be of other shapes, such as a semicircle shape etc. Moreover, the cross sections of the deforming portion and the cavity perpendicular to the length direction may also be of different shapes respectively. In addition, the cavity may be omitted also, as long as the deforming portion can elastically deforms at least in the height direction when subjected to a force towards the sealing surface.

A plurality of connection through-holes 140 are further provided between the protruding portion 120 and the deforming portion 130 for passing through the connecting pieces or fasteners such as bolts and the like used for refrigerator installation. Thus, the connection through-hole 140 may also be called a bolt hole 140. A plurality of the bolt holes 140 are disposed on the base body 110 along the length direction and spaced from each other with a predetermined distance in order to correspond to the refrigerator bolt hole on the surface of the front frame of the refrigerated container, respectively. Wherein, the bolt hole 140 is eccentrically provided in the width direction of the base body 110. Specifically, the minimum distance between the bolt hole 140 and the protruding portion 120 is less than the minimum distance between the bolt hole 140 and the deforming portion 130. That is to say, the bolt hole 140 is positioned closer to the side of the base body 110 provided with the protruding portion 120. The reason is that the side of the base body 110 provided with deforming portion 130 being positioned at an inner side of the bolt during installation could lead to a larger contact area between the sealing structure 10 inside the bolt and the front frame surface of the refrigerated container as well as the refrigerator bolt hole flange, such that sealing performance could be improved thereby.

Figure 3:
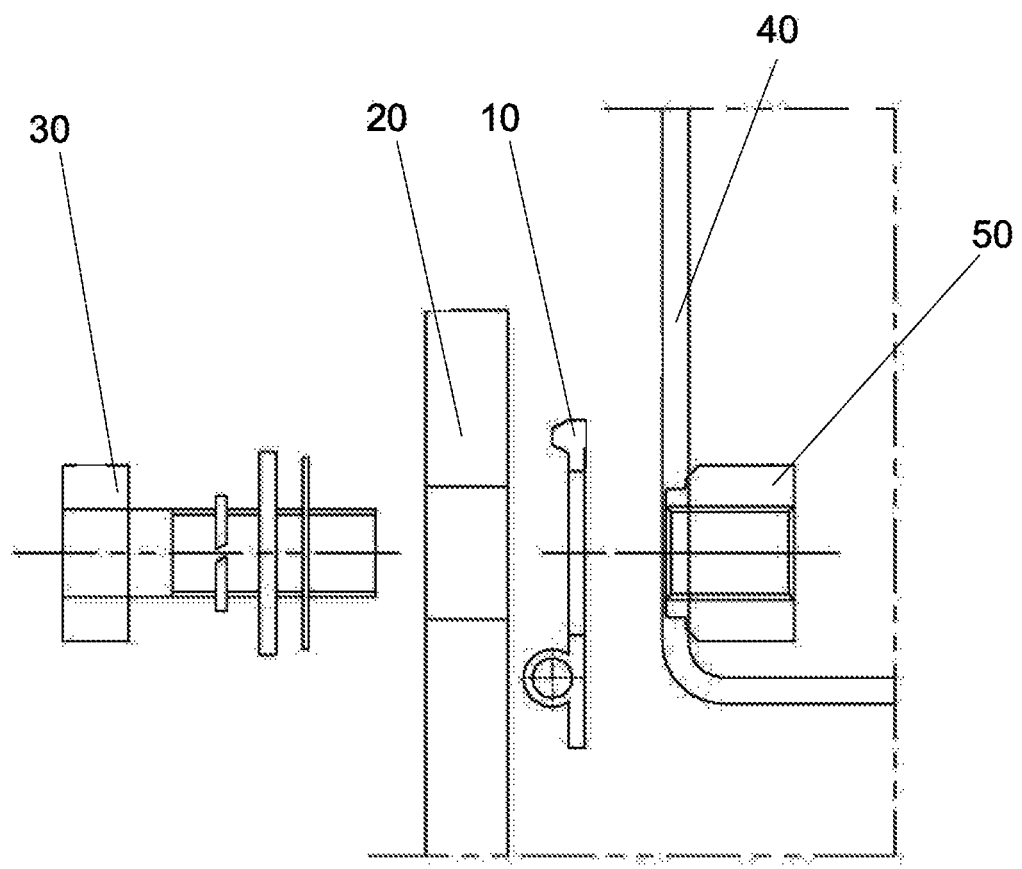
FIG. 3 is a schematic installation diagram of the sealing structure shown in FIG. 1

The process of installing the sealing structure 10 according to the present invention is as follows:

As shown in FIG. 3, a sticking surface 112 of the sealing structure 10 is first stuck on an outside surface of the front frame surface 40 of the refrigerated container, such that the bolt holes 140 of the sealing structure 10 correspond with the bolt holes on the front frame surface 40 of the refrigerated container one by one. The deforming portion 130 is positioned at an inner side of the bolt hole of the front frame surface 40 of the refrigerated container, and the protruding portion 120 is positioned at an outer side of the bolt hole of the front frame surface 40 of the refrigerated container.

The refrigerator is then installed. The inner surface of the refrigerator bolt hole flange 20 orients towards the sealing surface 111 of the sealing structure 10. The refrigerator bolt 30 passes through the refrigerator bolt hole flange 20, the bolt hole 140 of the sealing structure 10 and the bolt hole of the front frame surface 40 of the refrigerated container, and tightens with the refrigerator nut 50 so that the refrigerator bolt hold flange 20 applies an extrusion force on the sealing structure 10. The deforming portion 130 elastically deforms at least in a height direction under pressure. The deforming portion 130 continues to be squeezed so that the inner surface of the refrigerator bolt hole flange 20 contacts with the upper surface of the protruding portion 120. Since the sealing structure 10 has a certain hardness, the protruding portion 120 hardly deforms under the squeeze force even if the squeeze continues. As such, the upper surface of the protruding portion 120 tightly contacts with the inner surface of the refrigerator bolt hole flange 20. A part of outside surface of the deforming portion 130 tightly contacts with the inner surface of the refrigerator bolt hole flange 20 because of elastic deformation. That is to say, the inner surface of the refrigerator bolt hole flange 20 forms tight fitting with the sealing structure 10 at both sides of the refrigerator bolt 30, thereby achieving the sealing effect. At this moment, the installation is completed.

With the sealing structure according to the present invention, a new type sealing structure is added to the structure, and the sealing performance is enhanced, which significantly improves air tightness of a product, reduces hidden quality problems, simultaneously ensures performance in resistance to compression and weather during sealing structure installation, and increases the service life.

In accordance with another aspect of the present invention, a refrigerated container is also provided. A refrigerator is disposed in the refrigerated container, wherein, the refrigerated container and the refrigerator are connected at a joint which is sealed by the sealing structure as previously mentioned.

The present invention has been explained by the above embodiments, but it should be understood that the above embodiments are merely for the purpose of illustration and explanation rather than limiting the present invention within the scope described thereby. It will be appreciated by those skilled in the art that various transformations and modifications can be further made in accordance with the teachings of the present invention, which are within the scope of the invention as claimed. The protective scope of the invention is defined by the appended claims and the equivalent scope thereof.

The invention claimed is:

1. A sealing structure comprising:
   a base body being a flat and wide strip with a predetermined thickness;
   a protruding portion disposed on a sealing surface of the base body for sealing and configured to be a strip boss which protrudes outwardly relative to the sealing surface and extends along a length direction of the base body;
   a deforming portion disposed on the sealing surface and configured to protrude outwardly relative to the sealing surface and extend along the length direction of the base body, the deforming portion having an extension length which is the same as that of the protruding portion, and a protruding height which is larger than that of the protruding portion; and
   a plurality of connection through-holes disposed between the protruding portion and the deforming portion and passing through the base body along a thickness direction of the base body, the plurality of the connection through-holes being disposed spaced from each other along the length direction of the base body;
   wherein the cross section of the protruding portion perpendicular to the length direction thereof is of a rectangle;
   wherein the height of the deforming portion elastically decreases when the deforming portion suffers a force towards the sealing surface.

2. The sealing structure according to claim 1, wherein the cross section of the deforming portion perpendicular to the length direction thereof is of an O-shape or a semicircle shape.

3. The sealing structure according to claim 1, wherein a cavity extending along the length direction of the deforming portion is provided in the interior of the deforming portion.

4. The sealing structure according to claim 3 wherein the cross section of the cavity perpendicular to the length direction is of an O-shape or a semicircle shape.

5. The sealing structure according to claim 1 wherein the material of the sealing structure is flexible.

6. The sealing structure according to claim 5 wherein the material of the sealing structure is EPDM.

7. The sealing structure according to claim 1 further comprising a chamfering provided at a side of the upper surface of the protruding portion along the length direction.

8. The sealing structure according to claim 1 wherein the minimum distance between the connection through-hole and the protruding portion is less than the minimum distance between the connection through-hole and the deforming portion along the width direction of the base body.

9. The sealing structure according to claim 1, wherein the height of the protruding portion resists deformation when the protruding portion suffers a force towards the sealing surface.

* * * * *